(12) United States Patent
Fraas et al.

(10) Patent No.: US 6,271,461 B1
(45) Date of Patent: Aug. 7, 2001

(54) ANTIREFLECTION COATED REFRACTORY METAL MATCHED EMITTERS FOR USE IN THERMOPHOTOVOLTAIC GENERATORS

(75) Inventors: Lewis M. Fraas, Issaquah; John E. Samaras, Seattle; James E. Avery, Fall City, all of WA (US)

(73) Assignee: JX Crystals Inc., Issaquah, WA (US)

( * ) Notice: Subject to any disclaimer, the term of this patent is extended or adjusted under 35 U.S.C. 154(b) by 0 days.

(21) Appl. No.: 09/583,977

(22) Filed: May 31, 2000

Related U.S. Application Data (60) Provisional application No. 60/194,051, filed on Apr. 3, 2000.

(51) Int. Cl.[7] .................................................. H01L 31/058
(52) U.S. Cl. ..................... 136/253; 136/262; 428/689; 428/690; 428/913; 428/446; 428/448; 428/457; 428/469; 428/472
(58) Field of Search ..................................... 136/253, 262; 428/689, 690, 913, 446, 448, 457, 469, 472

(56) References Cited

U.S. PATENT DOCUMENTS

| | | |
|---|---|---|
| 3,331,707 * | 7/1967 | Werth .................................. 136/253 |
| 3,433,676 | 3/1969 | Stein . |
| 3,751,303 | 8/1973 | Kittl . |
| 3,929,510 | 12/1975 | Kittl . |
| 4,045,246 | 8/1977 | Mlavsky et al. . |

(List continued on next page.)

FOREIGN PATENT DOCUMENTS 63-316486   12/1988   (JP) .

OTHER PUBLICATIONS

Hofler et al, "Selective Emitters for Thermophotovoltaic Solar Energy Conversion," Solar Cells, vol. 10, 1983, pp. 257–271, (month unknown).*

Fraas, Lewis et al., "Status of TPV Commercial System Development Using GaSb Infrared Sensitive Cells," Paper presented at Second World Photovoltaic Specialists Conference, Vienna, Austria, Jul. 6–10, 1998.

JX Crystals Inc., Sales brochure for the Midnight Sun® Stove, "Congenerates 100 watts of electricity," Issaquah, WA. (Date Unknown).

Morgan, M.D. et al., "Radioisotope Thermal Photovoltaic Application of the GaSb Solar Cell," NASA SPRAT Conference, pp. 349–358, (U.S.A.) Jan. 1989).

A.C. Day, W.E. Horne and M.D. Morgan, "Application of the FaSb Solar Cell in Isotope–Heated Power Systems," Conference Record of the 21st IEEE Photovoltaic Specialists Conference, Kissimmee, FL., May 1990, pp. 1320–1325.

E. Kittle and G. Guazzoni, "Design Analysis of TPV–Generator System," Proceedings of the 25th Annual Power Sources Conference, May 1972, pp. 106–110.

(List continued on next page.)

*Primary Examiner*—Alan Diamond
(74) *Attorney, Agent, or Firm*—James Creighton Wray; Meera P. Narasimhan (57) ABSTRACT

Thermophotovoltaic (TPV) electric power generators have emitters with infrared (IR) outputs matched with usable wavelengths for converter cells. The emitters have durable substrates, optional refractory isolating layers, conductive refractory metal or inter-metallic emitter layers, and refractory metal oxide antireflection layers. SiC substrates have tungsten or $TaSi_2$ emitter layers and 0.14 micron $HfO_2$, $ZrO_2$, $Al_2O_3$, $Ta_2O_5$ and $TiO_2$ antireflection layers used as IR emitters for GaSb converter cells in TPV generators.

18 Claims, 8 Drawing Sheets

U.S. PATENT DOCUMENTS

| | | |
|---|---|---|
| 4,180,414 | 12/1979 | Diamond et al. . |
| 4,234,352 | 11/1980 | Swanson . |
| 4,707,560 | 11/1987 | Hottel et al. . |
| 4,746,370 | 5/1988 | Woolf . |
| 4,776,895 | 10/1988 | Goldstein . |
| 4,906,178 | 3/1990 | Goldstein et al. . |
| 4,976,606 | 12/1990 | Nelson . |
| 5,044,939 | 9/1991 | Dehlson . |
| 5,080,724 | 1/1992 | Chubb . |
| 5,091,018 | 2/1992 | Fraas et al. . |
| 5,096,505 | 3/1992 | Fraas et al. . |
| 5,118,361 | 6/1992 | Fraas et al. . |
| 5,123,968 | 6/1992 | Fraas et al. . |
| 5,217,539 | 6/1993 | Fraas et al. . |
| 5,248,346 | 9/1993 | Fraas et al. . |
| 5,255,666 | 10/1993 | Churchod . |
| 5,312,521 | 5/1994 | Fraas et al. . |
| 5,356,487 * | 10/1994 | Goldstein et al. .................. 136/253 |
| 5,383,976 | 1/1995 | Fraas et al. . |
| 5,389,158 | 2/1995 | Fraas et al. . |
| 5,401,329 | 3/1995 | Fraas et al. . |
| 5,403,405 | 4/1995 | Fraas et al. . |
| 5,439,532 | 8/1995 | Fraas . |
| 5,505,789 | 4/1996 | Fraas et al. . |
| 5,512,109 | 4/1996 | Fraas et al. . |
| 5,551,992 | 9/1996 | Fraas . |
| 5,560,783 | 10/1996 | Hamlen . |
| 5,601,661 | 2/1997 | Milstein et al. . |
| 5,616,186 | 4/1997 | Fraas et al. . |
| 5,651,838 | 7/1997 | Fraas et al. . |
| 5,865,906 * | 2/1999 | Ferguson et al. .................. 136/253 |
| 5,942,047 * | 8/1999 | Fraas et al. ..................... 136/253 |
| 6,072,116 * | 6/2000 | Brandhorst, Jr. et al. .......... 136/253 |
| 6,091,018 * | 7/2000 | Fraas et al. ..................... 136/253 |

OTHER PUBLICATIONS

Whitaker, T., "GaSb Shines Brighter Than The Midnight Sun," Compound Semiconductor, Fall I, 1998, pp. 33–34.

JX Crystals Inc., Sales brochure for the Midnight Sun®, "JX Crystals introduces a new concept in off-grid heaters," Issaquah, WA. (Date Unknown).

JX Crystals Inc., Babcock & Wilcox, informational brochure, "High Performance 500 Watt Portable Thermophotovoltaic Power Supply Using Diesel Fuel Being Developed by Babcock & Wilcox and JX Crystals," rev. Mar. 20, 1997.

L.D. Woolf, "Optimum Efficiency of Single and Multiple Bandgap Cells in Thermophotovoltaic Energy Conversion, "Solar Cells, 19(1986–1987), pp. 19–38.

H. Höfler, P. Würfel and W. Ruppel, "Selective Emitters for Thermophotovoltaic Solar Energy Conversion," Solar Cells, 10(Dec. 19883), pp. 257–271.

H. Höfler, et al., "Selective Absorbers and Interference Filters for Thermophotovoltaic Energy Conversion," Proceedings of the 5th E.C. Photovoltaic Solar Energy Conference Athens, Greece, Oct. 1983, pp. 225–229.

D.L. Chubb, "Reappraisal of Solid Selective Emitters," Conference Record of teh 21st IEEE Photovoltaic Specialists Conference, May 1990, Kissimmee, FL., pp. 1326–1333.

* cited by examiner

ANTIREFLECTION COATED REFRACTORY METAL MATCHED EMITTERS FOR USE IN THERMOPHOTOVOLTAIC GENERATORS

This application claims the benefit of U.S. Provisional Application No. 60/194,051, filed Apr. 3, 2000.

BACKGROUND OF THE INVENTION

Recently, low bandgap photovoltaic cells such as the GaSb cell have made it possible to produce practical thermophotovoltaic (TPV) electric power generators. The low bandgap cells in these TPV generators convert infrared (IR) radiation from heated (IR) emitters into electric power. The IR emitters in these units operate at moderate temperatures between 900° C. and 1400° C. Baseline commercial TPV generators use gray-body SiC emitters with GaSb cells. The SiC emitter emits infrared energy at all wavelengths. However, the GaSb cells convert only infrared photons with wavelengths less than 1.8 microns to electric power. Infrared filters are used to reflect some of the non-useful longer wavelength photons back to the emitter. Unfortunately, the available filters are far from perfect. Some non-convertible infrared radiation still passes through the filters, and some of the reflected photons do not hit the emitter after reflection by the filter.

It is preferable to replace the gray-body emitter with a "matched" infrared emitter that emits only convertible infrared radiation. Mathematically, this perfect "matched" emitter has an emittance of 1.0 for wavelengths less than 1.8 microns and 0 for longer wavelengths. Several prior art infrared emitters have been proposed for use in TPV generators.

The oldest type of IR emitter proposed is the rare earth oxide selective emitter. Erbia is an example of this type of emitter. While the emittance at 1.5 microns can be as high as 0.5, the emittance for erbia falls to 0.1 at 1.4 and 1.6 microns and rises again beyond 3 microns. The result is that the emitted useful power is small because of the narrow emittance bandwidth. Furthermore, the spectral efficiency, defined as the in-band convertible power divided by the total emitted power, is low because a lot of power is emitted at wavelengths beyond 3 microns.

Refractory metal IR emitters, such as tungsten, have also been described. Those materials are somewhat selective in that the emittance at 1.5 microns (typically 0.3) is higher than the emittance at longer wavelengths (0.15 at 3 microns). Unlike the oxide emitters, the emittance stays low at long wavelengths (0.1 at 6 microns). Unfortunately, these metal emitters need to run very hot because of the low in-band emittance. They also produce volatile oxides when operated in air.

Recently, JX Crystals has described a cobalt doped spinel "matched" emitter. This "matched" emitter has an emittance of 0.7 at 1.5 microns with a large bandwidth. This emitter is selective, because the emittance falls off to 0.25 at 3 microns. Unfortunately, however, like all oxide emitters, the emittance rises again beyond 6 microns.

There are other disadvantages of the oxide emitters. Specifically, they are subject to cracking upon extensive thermal cycling, and they have poor thermal conductivity.

It is desirable to find an improved "matched" emitter with a high emittance at wavelengths below 1.8 microns and low emittance for all longer wavelengths. It is very desirable to find a "matched" emitter coating that may be applied to the current SiC emitter structures, since SiC is a proven material with good thermal conductivity and thermal cycle durability.

SUMMARY OF THE INVENTION

The invention provides a matched emitter which emits infrared radiation at 1.8 microns and less than 1.8 microns to match the wavelengths of photons that GaSb cells absorb and convert to electricity.

In one form, a refractory metal coating such as tungsten (W) having a thickness of about 4 microns or from about 1–6 microns is deposited on a durable high temperature substrate such as SiC. The W coating may be isolated chemically from the substrate by a refractory oxide coating, such as $HfO_2$, $Ta_2O_5$, $ZrO_2$ or $Al_2O_3$, so that it does not react with the substrate. The W coating is coated with a high index refractory oxide coating of a thickness such that a minimum reflectivity occurs in the center of the cell convertible wavelength band. This refractory oxide coating serves as an anti-reflection (AR) coating. The thickness of the oxide coating is specifically set to produce an absorption (emission) peak in the TPV cell conversion wavelength band.

In another embodiment, a refractory inter-metallic coating such as $TaSi_2$ is deposited on a durable high temperature substrate such as SiC. The metal silicide coating may be isolated chemically from the substrate by a refractory oxide coating, such as $Ta_2O_5$, so that it does not react with the substrate. In the case that the durable substrate is SiC, the inter-metallic coating can be a refractory compound containing a metal such as Ta along with Si and C. Alternative inter-metallic compounds may include $Pd_m(Si_{1-x}C_x)$ or $Pt_m(Si_{1-x}C_x)_n$. The metal silicide is coated with a high index refractory oxide coating of a thickness such that a minimum reflectivity occurs in the center of the cell convertible wavelength band. This refractory oxide coating serves as an anti-reflection (AR) coating. The thickness of the oxide coating is specifically set to produce an absorption (emission) peak in the TPV cell conversion wavelength band.

Key elements in this concept are the reflecting metallic or inter-metallic coating, the AR coating, and the durable substrate. In the case of a TPV generator using GaSb cells, this AR wavelength is about 1.4 microns. A spacer layer may be provided between the substrate and metallic layers to prevent interaction of the two.

A typical thickness for the metal silicide is approximately 4.0 microns, while a typical thickness for the refractory oxide AR coatings is approximately 0.14 microns. Various substrates are possible including but not limited to SiC, Ta, NICHROME (alloys of nickel, chromium and iron), KANTHAL (heat resistant metal alloys) and stainless steel. Various metal silicides are possible including but not limited to $TaSi_2$, $NbSi_2$, $TiSi_2$, and $VSi_2$. Various refractory oxides are possible including, but not limited to, $HfO_2$, $Ta_2O_5$, $Al_2O_3$, $TiO_2$ and $ZrO_2$.

Adding Si to the Ta has two beneficial effects. First, the emittance at 1.5 microns increases from 0.3 to 0.55. Second, the silicides are more resistant to oxidation. Adding an AR coating then amplifies on these same two beneficial effects. The AR coating increases the emittance again from 0.55 to 0.98 at 1.5 microns, and the refractory oxide AR coating protects the structure from oxidation.

In another preferred embodiment, another AR coating includes, but is not limited to, hafnia ($HfO_2$) as the refractory oxide. Hafnia survives higher temperatures. Emissivity measurements show excellent spectral selectivity and no change in emissivity at temperatures up to 1300° C. This is consistent with the Ultramet data showing that hafnia has 10–100 times lower vapor pressures and evaporation rates at 1650°

C. than either alumina or zirconia. Hafnia also has a lower thermal expansion coefficient (closer to tungsten) than alumina or zirconia and a high refractive index of 1.9, almost as good as zirconia (2.0) and higher than alumina (1.63). A higher index gives a higher emittance at the resonant peak.

The AR coated refractory metal "matched" emitters of the present invention are useable with cells other than the GaSb cell. They are adaptable to cells that respond out to 2.3 microns by simply shifting the thickness of the AR coating. They may be used in various environments including air, vacuum, or various inert atmospheres. They may be used with various heat sources, including not just hydrocarbon flames but also nuclear heat sources.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
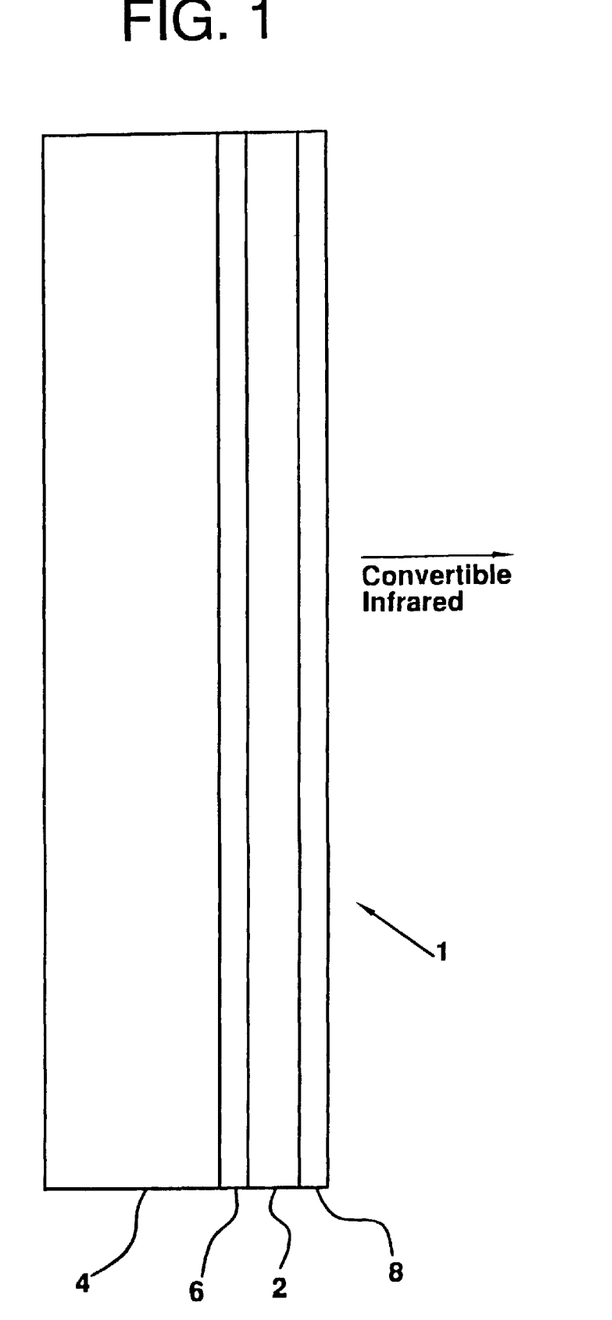
FIG. 1 is a side view of an AR coated refractory metal matched emitter.

FIG. 1 shows the structure of the AR coated refractory metal "matched" emitter 1 of the present invention. A refractory metal or metal silicide emitter layer 2, such as W or $TaSi_2$, is deposited on a durable high temperature substrate 4, such as SiC. The metal or metal silicide emitter layer 2 is isolated chemically from the substrate 4 by a refractory oxide 6, such as $HfO_2$, so that the emitter layer does not react with the substrate. Finally, the metal or metal silicide 2 is coated with a high index refractory oxide coating 8 of a thickness such that a minimum reflectivity occurs in the center of the cell convertible wavelength band. This refractory oxide coating 8 serves as an anti-reflection (AR) coating. In the case of a TPV generator using GaSb cells, this AR wavelength is about 1.4 microns. A typical thickness for the metal or metal silicide is approximately 4.0 microns for W or for the $TaSi_2$. A typical thickness for the refractory oxide coatings is approximately 0.14 microns. Various substrates 4 are possible including, but not limited to, SiC, Ta, NICHROME, KANTHAL, and stainless steel. Various refractory metal emitters 2 are possible, including, but not limited to, W, Ta, Nb and Mo. Various metal silicides 2 are possible including, but not limited to, $TaSi_2$, $NbSi_2$, $TiSi_2$, and $VSi_2$. Various refractory oxides 6 and 8 are possible including, but not limited to, $HfO_2$, $Ta_2O_5$, $Al_2O_3$, $TiO_2$, and $ZrO_2$.

Figure 7:
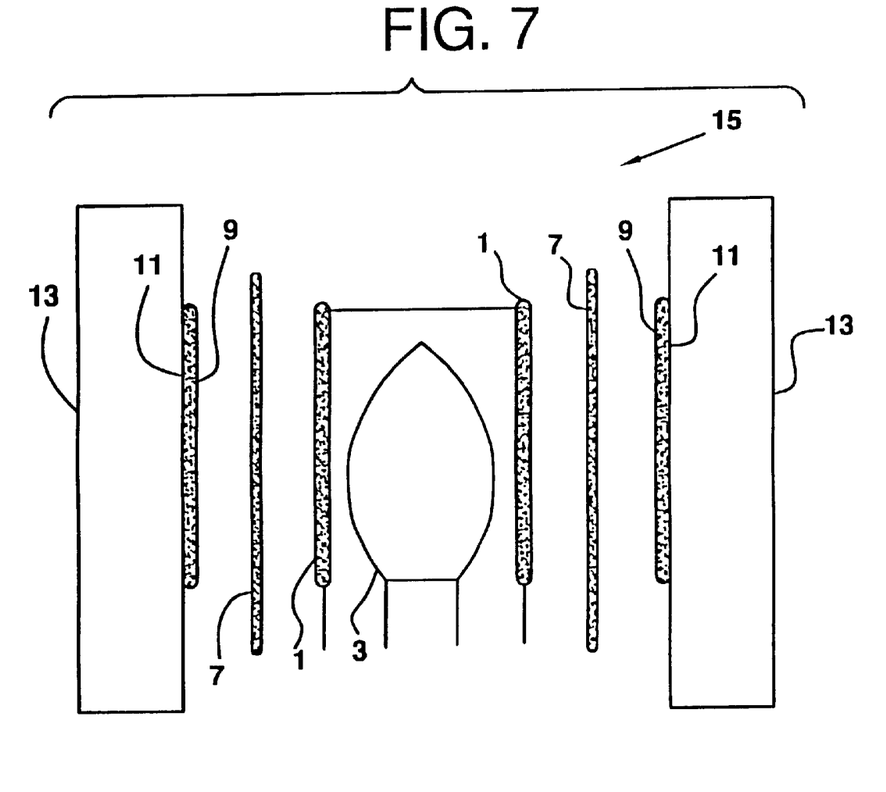
FIG. 7 shows a vertical section through a thermophotovoltaic generator.

The emitter structure 1 of FIG. 1 is effective as a "matched" emitter for TPV generators (shown in FIG. 7). This may be seen by reference to Tables 1, 2, and 3, and to FIGS. 2, 3, and 4. Referring to table 1, the emittances for SiC, tungsten (W), and cobalt doped spinel at 1.5, 3, and 6 microns are given for reference. Refer now to the emittances of Ta, $TaSi_2$, and AR coated $TaSi_2$. The emittance of Ta by itself is similar to that of W. Adding Si to the Ta has two beneficial effects. First, the emittance at 1.5 microns increases from 0.3 to 0.55. Second, the silicides are more resistant to oxidation. Adding an AR coating then amplifies on these same two beneficial effects. Th AR coating increases the emittance again from 0.55 to 0.98 at 1.4 microns, and the refractory oxide AR coating protects the structure from oxidation.

Figure 2:
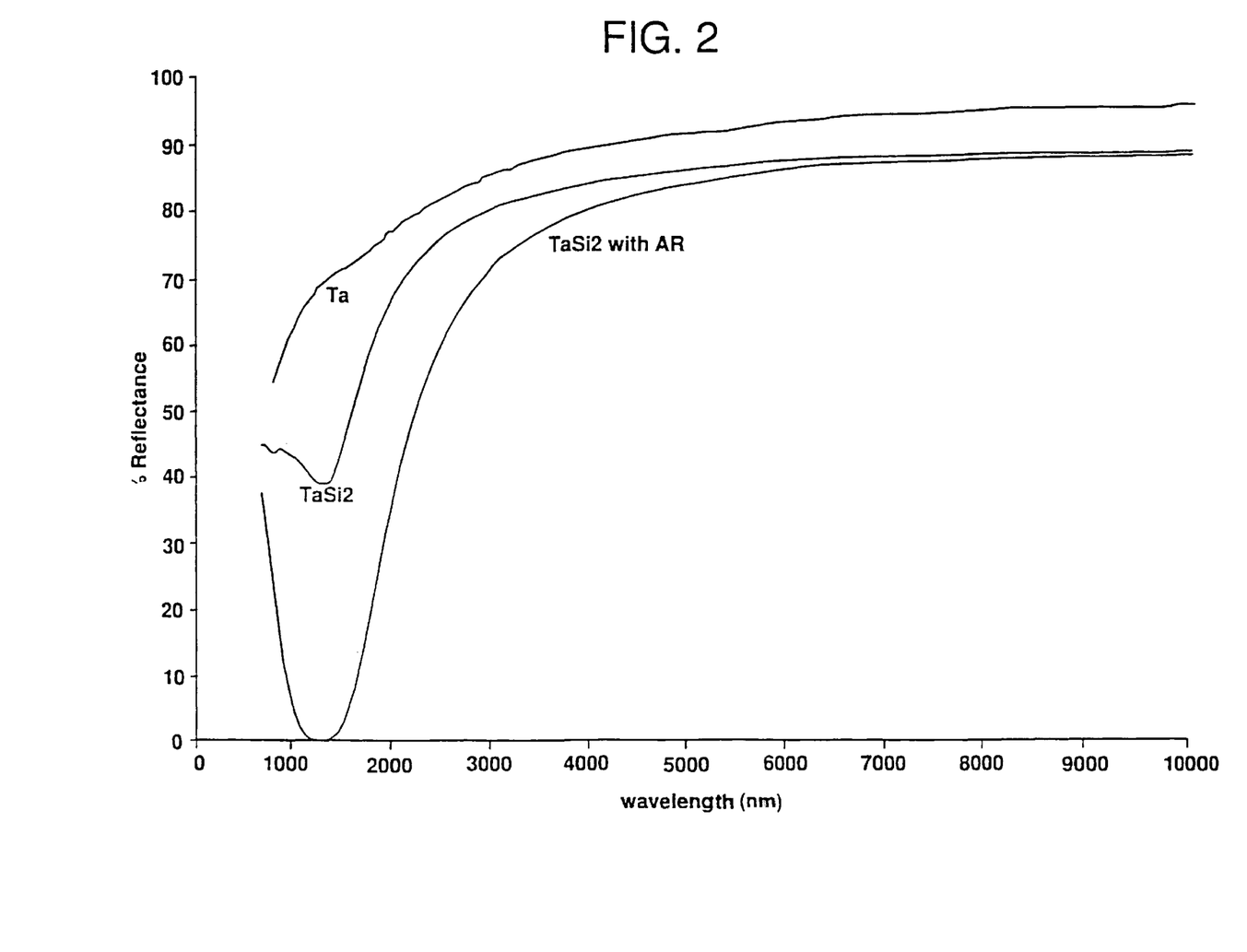
FIG. 2 is a graph of the reflection curves for Ta, $TaSi_2$ and AR coated $TaSi_2$.

FIG. 2 shows the reflection curves for Ta, $TaSi_2$, and AR coated $TaSi_2$ as a function of wavelength. Note that while the reflectivity decreases at 1.5 microns, the reflectivity at long wavelengths remains high for our refractory metal silicide "matched" emitter.

Figure 3:
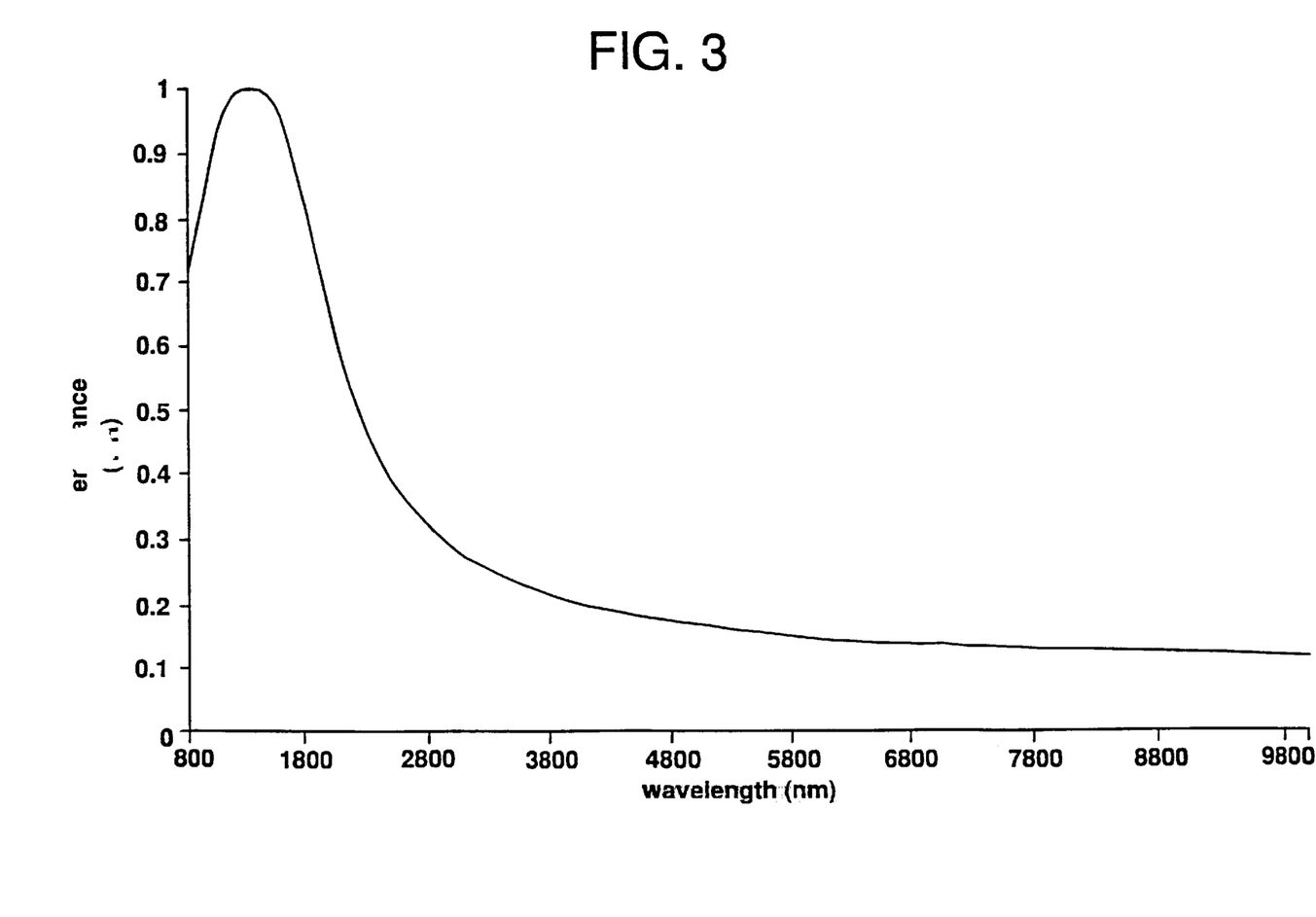
FIG. 3 is the emittance curve for the refractory metal silicide matched emitter.

Since the absorptance and emittance for metals are simply minus the reflectivity, FIG. 3 shows the emittance curve for our refractory metal silicide "matched" emitter.

Referring again to Table 1, note that the refractory meta silicide "matched" emitter of the present invention has the highest in-band emittance relative to all of the available emitters. This means that more electric power is producible for a given emitter temperature. Also note that the ratio of in-band emittance to out-of-band emittance for our AR coated refractor metal "matched" emitter is higher than for any other emitter. This leads to higher conversion efficiency.

Figure 4:
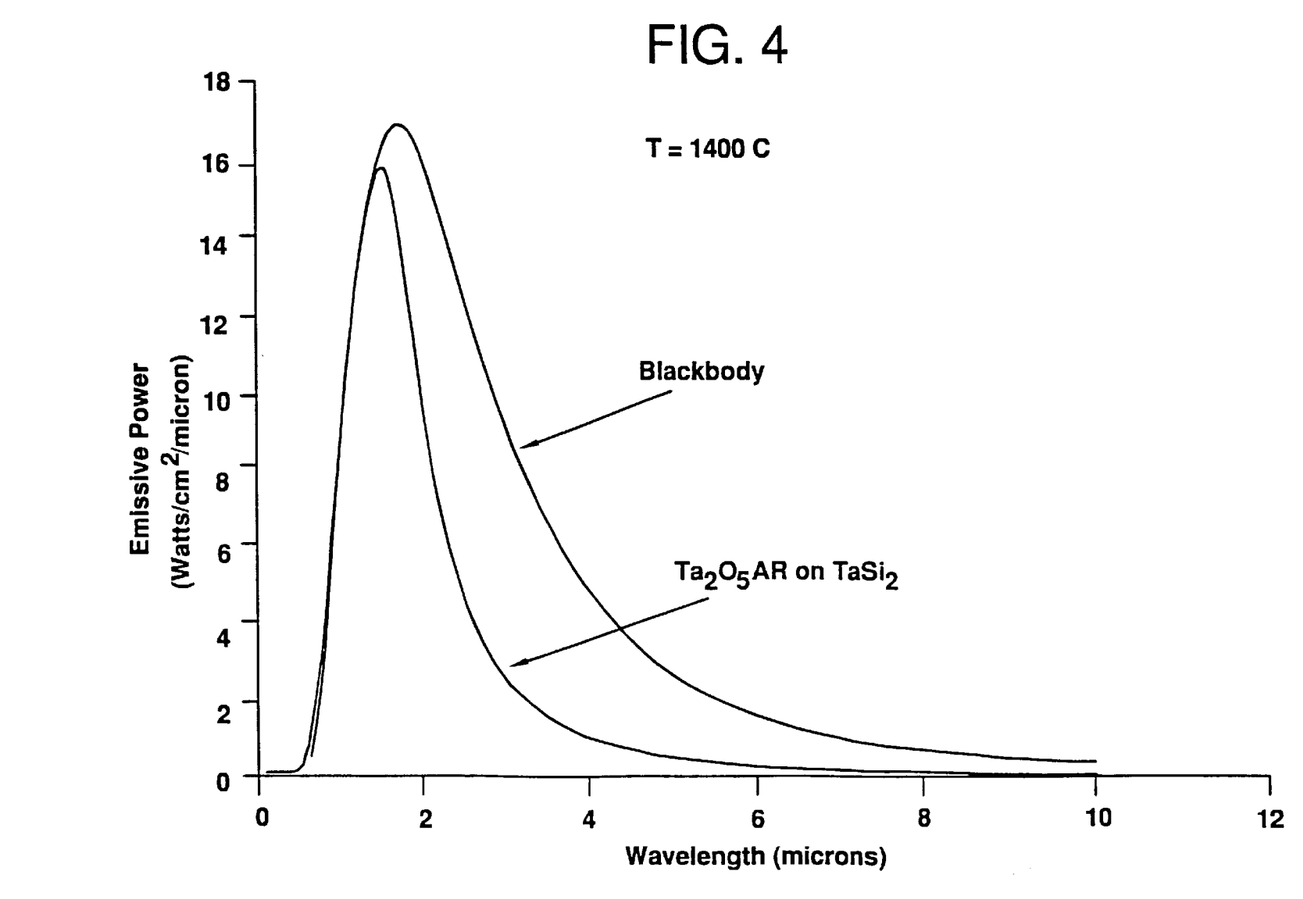
FIG. 4 is a graph of the emissive power for the refractory metal silicide matched emitter and a SiC (blackbody) emitter.

FIG. 4 and Table 2 allow a comparison of a emitter with our refractory metal silicide "matched" emitter. FIG. 4 shows the emissive power as a function of wavelength for an AR-coated $TaSi_2$ emitter and a blackbody emitter with both operating at 1400° C. Table 2 gives the calculated values for the in-band emitted power, the out-of-band emitted power, and the spectral efficiency for these two emitters. Note that the in-band power is nearly the same for each, while the out-of-band power is reduced by a factor of 3 for the AR-coated $TaSi_2$ emitter. The spectral efficiency is increased by nearly a factor of 2.

The AR coated refractory silicide "matched" emitters of the present invention are useable with cells other than the GaSb cell. They are adaptable to cells that respond out to 2.3 micron wavelengths by simply shifting the thickness of the AR coating. They may be used in various environments including air, vacuum, or various inert atmospheres. They may be used with various heat sources, including not just hydrocarbon flames but also nuclear heat sources.

The matched emitter concept described here can be restated in more general terms as follows. Three elements are required: a durable refractory substrate 4 (FIG. 1) with a refractory metallic (RM) coating 2 (FIG. 1) with a resonant antireflection (AR) coating 8 (FIG. 1). In this three element system, the metallic coating 2 must be carefully chosen such that the $2nk/\lambda$ product for the material drops to 15 or lower at the desired resonant point and then rapidly rises for longer wavelengths. A spacer layer may be provided between the SiC and tungsten layers to prevent interaction of the two.

Figure 5:
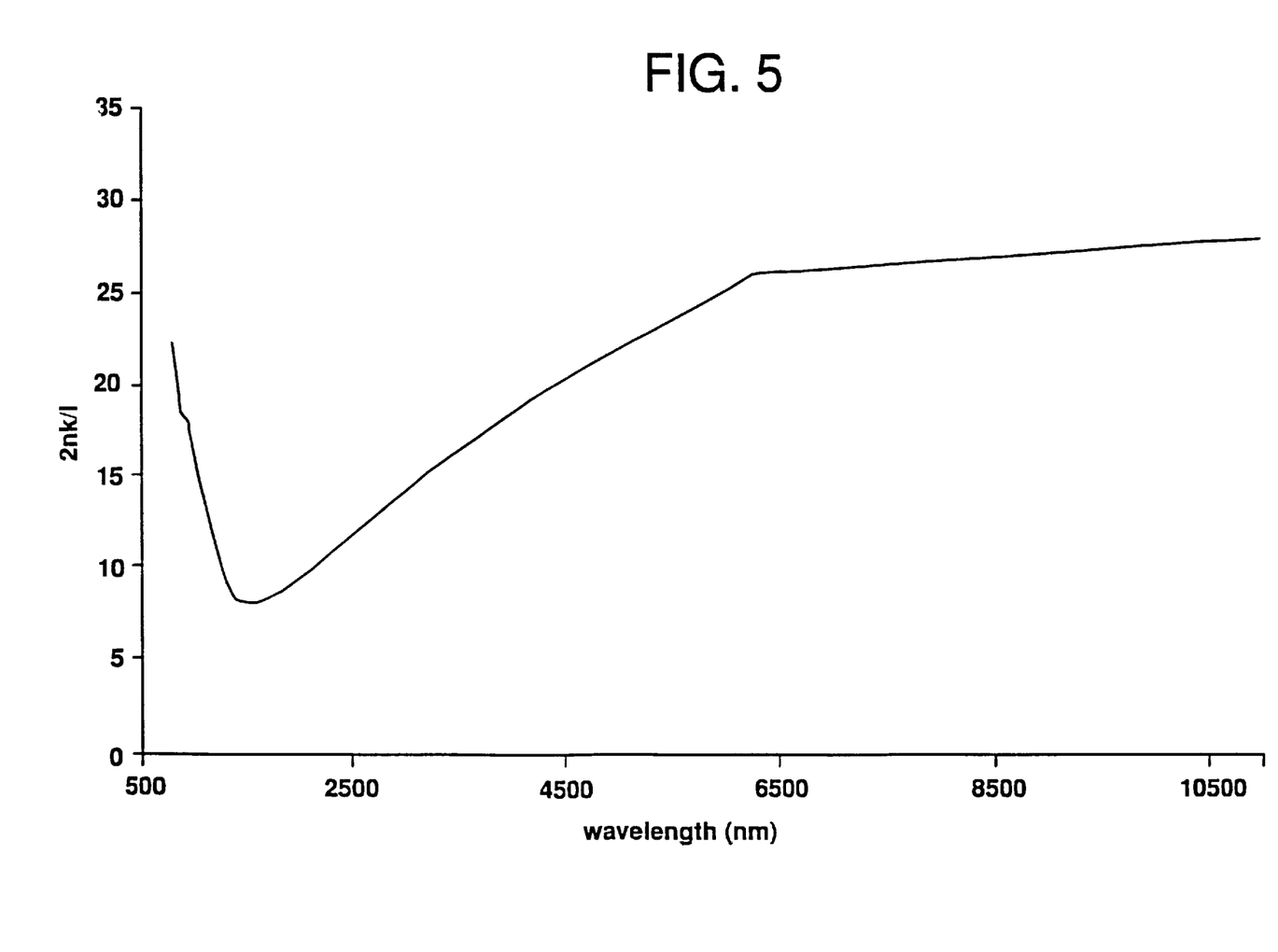
FIG. 5 is a graph of $2nk/\lambda$ vs wavelength for $TaSi_2$.
Figure 6:
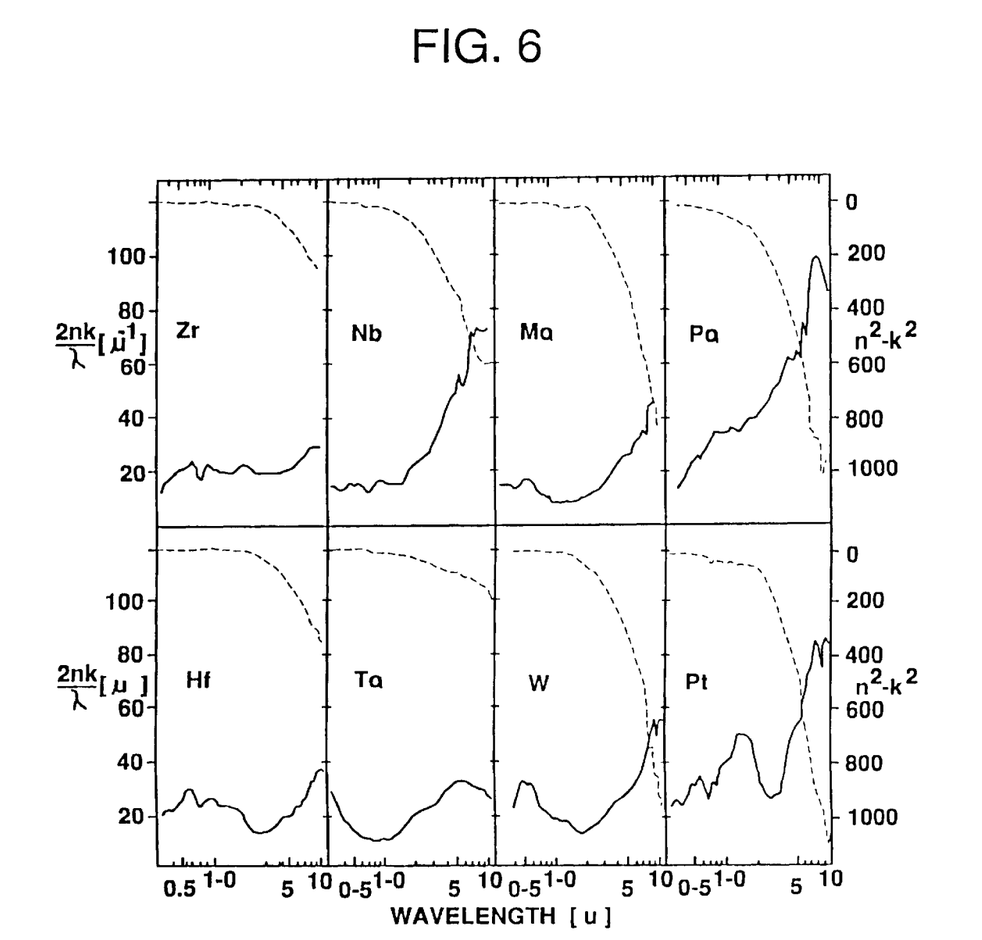
FIG. 6 is a graph of $2nk/\lambda$ vs wavelength for several pure metals.

FIG. 5 shows a plot of $2nk/\lambda$ vs $\lambda$ for $TaSi_2$, while FIG. 6 shows plots of $2nk/\lambda$ vs $\lambda$ for various pure metals. Referring to FIG. 6 suggests that pure Ta, W, Nb, or Mo could be used with an AR coating to create a matched emitter falling under the present invention. Pure Pd would not work because the AR coated resonance would be weak.

One of the best specific AR/RM is $HfO_2$ on W. Another consists of 4 microns of W on SiC followed by an AR coating of $ZrO_2$. Yet another is $Al_2O_3$ AR on W on SiC.

Referring to FIG. 7, a thermophotovoltaic (TPV) generator 15 apparatus includes, in the order of energy flow, a heat source 3, a matched coated infrared emitter 1, an optional silica heat shield 7, an infrared filter 9 and a low bandgap photovoltaic cell receiver 11. The power band of the emitter 1 is matched with the energy conversion band of the TPV cells of the receiver 11. The heat source 3 heats the infrared emitter 1, which in turn emits infrared radiation. Low bandgap cells of the receiver 11 collect infrared radiation of a particular wavelength and convert the collected infrared radiation to electric power.

Figure 8:
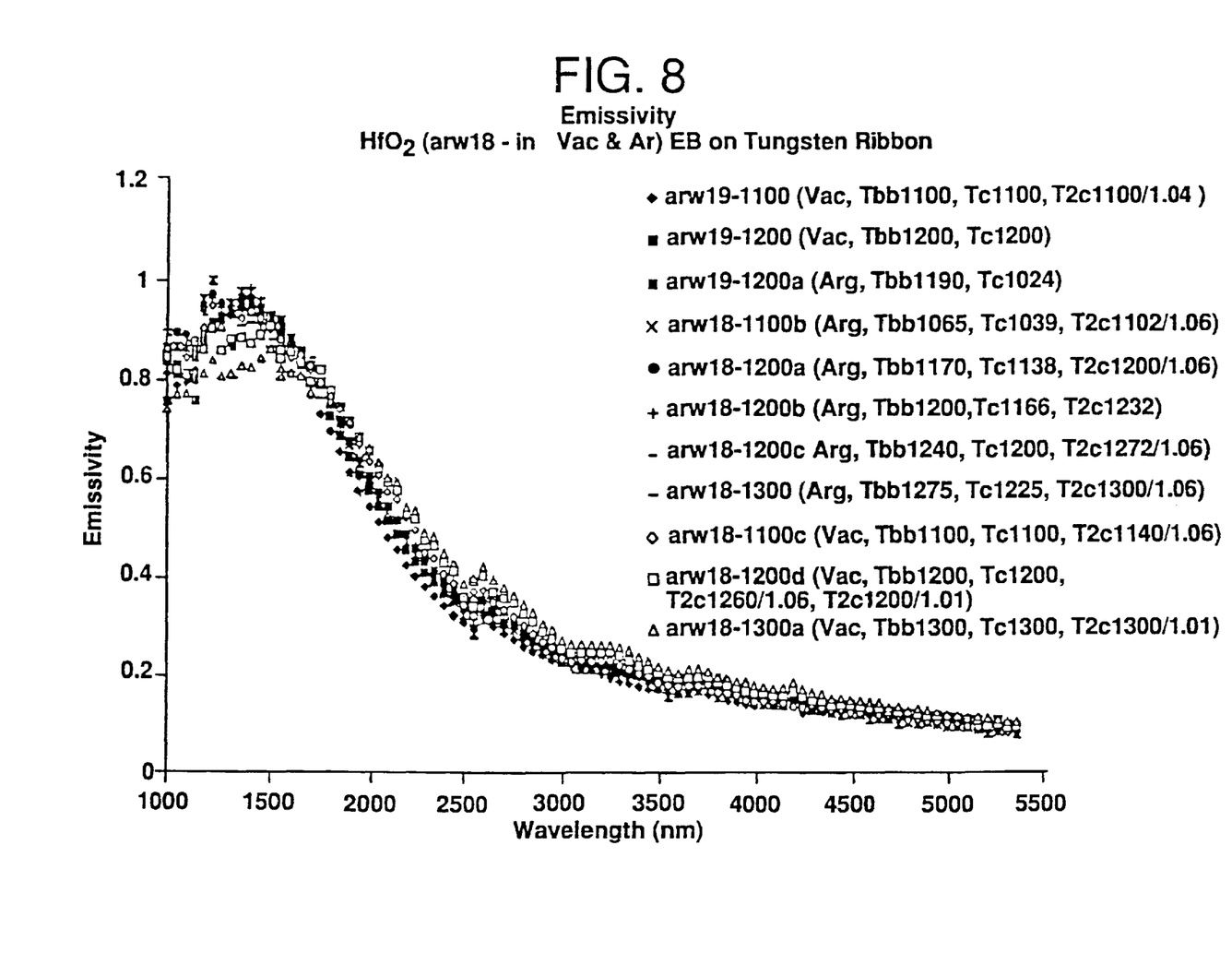
FIG. 8 is a graph of the emissivity of hafnia AR coated tungsten.

The refractory oxides include, but is not limited to, hafnia. Hafnia survives higher temperatures. FIG. 8 shows the emissivity of hafnia ($HfO_2$) AR on tungsten. Emissivity measurements show excellent spectral selectivity and no change in emissivity at temperatures up to 1300° C. This is consistent with the Ultramet data (Table 3) showing hafnia having 10–100 times lower vapor pressures and evaporation rates at 1650° C. than either alumina or zirconia. Hafnia also has a lower thermal expansion coefficient (closer to tungsten) than alumina or zirconia and a high refractive index of 1.9, almost as good as zirconia (2.0) and higher than alumina (1.63). A higher index gives a higher emittance at the resonant peak. A preferred combination includes a refractory metal coating of tungsten with a hafnia AR coating.

While the invention has been described with reference to specific embodiments, modifications and variations of the invention may be constructed without departing from the scope of the invention, which is defined in the following claims.

TABLE 1

Emittance Values for Various TPV Emitter Materials

| Material | $\epsilon$ at 1.5 $\mu$m | $\epsilon$ at 3 $\mu$m | $\epsilon$ at 6 $\mu$m |
|---|---|---|---|
| SiC | 0.8 | 0.85 | 0.9 |
| W | 0.3 | 0.15 | 0.1 |
| Co/Spinel | 0.7 | 0.25 | 0.7 |
| Ta | 0.3 | 0.15 | 0.1 |
| $TaSi_2$ | 0.55 | 0.25 | 0.15 |
| AR/$TaSi_2$ | 0.98 | 0.28 | 0.15 |

TABLE 2

Power densities and spectral efficiency at 1400° C.

| Material | P (0.7 to 1.8 $\mu$m) | P (1.8 to 10) | Efficiency |
|---|---|---|---|
| Blackbody | 12.2 W/cm$^2$ | 31.1 W/cm$^2$ | 0.28 |
| AR/$TaSi_2$ | 11.5 W/cm$^2$ | 10.7 W/cm$^2$ | 0.52 |

TABLE 3

Refractory Oxides

Ultramet has developed processes for fabricating coatings of the oxides of hafnium ($HfO_2$), zirconium ($ZrO_2$), tantalum ($Ta_2O_5$), titanium ($TiO_2$), aluminum ($Al_2O_3$), silicon ($SiO_2$) and yttrium ($Y_2O_3$). These oxides can be applied by CVD as a 100% dense, pinhole-free coating to a variety of materials, including refractory metals, ceramics, and composites. Used for high temperature oxidation and corrosion resistance (e.g. sulfur, vanadium), these coatings are capable of extending either the service life or operating temperature capability of many components, including rocket nozzles, piston heads and liners, turbine blades, and fuel-fired heat exchanger components.

| | $ThO_2$ | $HfO_2$ | $ZrO_2$ | $Y_2O_3$ | $Al_2O_3$ | $SiO_2$ |
|---|---|---|---|---|---|---|
| MELTING TEMPERATURE (° C.) | 3050 | 2810 | 2700 | 2460 | 2015 | 1728 |
| DENSITY (g/cc) | 9.86 | 9.68 | 5.60 | 5.03 | 3.98 | 2.32 |
| THERMAL EXPANSION (ppm/° C.) | 9.5 | 6.8 | 7.5 | 6.8 | 8.1 | 0.5 |
| OXIDATION LIMIT (° C.) | 2700 | 2500 | 2500 | 2200? | 2015 | 1680 |
| LIMIT of STABILITY w/CARBON (° C.) | 2000 | 1700 | 1600 | — | 1900 | — |
| VAPOR PRESSURE (Pa) | | | | | | |
| ($\times 10^{-6}$) @ 1650° C. | 9.41 | 0.13 | 10.6 | — | 133 | — |
| ($\times 10^{-5}$) @ 1927° C. | 138 | 3.93 | 127 | — | 50 | — |
| ($\times 10^{-3}$) @ 2200° C. | 77.0 | 3.26 | 78.7 | — | 22 | — |
| EVAPORATION RATE ($\mu$m/hr) | | | | | | |
| ($\times 10^{-6}$) @ 1650° C. | 540 | 6.7 | 670 | — | — | — |
| @ 1927° C. | 0.74 | .019 | 0.75 | — | — | — |
| @ 2200° C. | 39 | 1.4 | 44 | — | — | — |
| CRYSTAL STRUCTURE | FCC* | FCC* | FCC* | BCC | HCP | CT |
| OXYGEN PERMEABILITY (g/cm-sec) ($\times 10^{-13}$) @ 1000° C. | — | 460 | 120 | 9.5 | — | — |

We claim:

1. Antireflection coated matched emitters for thermophotovoltaic cells, comprising a durable high temperature substrate, a tungsten film emitter coating on the substrate, and an antireflection metal oxide coating on the tungsten film wherein the metal oxide coating is $HfO_2$.

2. The matched emitters of claim 1, wherein the tungsten coating is about 4 microns in thickness.

3. The matched emitters of claim 2, wherein the substrate is sic.

4. The matched emitters of claim 1, further comprising a refractory oxide coating on the substrate for chemically isolating the emitter coating from the substrate.-

5. The matched emitters of claim 1, wherein the antireflection metal oxide coating is about 0.14 microns thick.

6. An antireflection coated matched emitter for thermophotovoltaic cells, comprising:
   a durable high temperature substrate;
   a metal or metal silicide emitter layer coating on the substrate; and
   an antireflective $HfO_2$ coating on the emitter layer.

7. The matched emitter of claim 6, wherein the substrate comprises SiC.

8. The matched emitter of claim 6, wherein the metal emitter layer comprises pure W.

9. The matched emitter of claim 6, wherein the metal silicide emitter comprises $TaSi_2$.

10. The matched emitter of claim 6, wherein the antireflective $HfO_2$ coating has a thickness of about 0.14 microns.

11. The matched emitter of claim 6 wherein the substrate is selected from the group consisting of SiC, Ta, metal alloys and stainless steel.

12. The matched emitter of claim 6, wherein the emitter layer is a metal selected from the group consisting of W, Ta, Nb and Mo.

13. The matched emitter of claim 6, wherein the metal silicide emitter is selected from the group of metal silicides consisting of $TaSi_2$, $NbSi_2$, $TiSi_2$ and $VSi_2$.

14. A thermophotovoltaic generator, comprising a heat source, an emitter for receiving heat from the source and emitting infrared light waves having wavelengths of about 1.8 microns and less, an infrared filter for passing infrared energy and reflecting wavelengths greater than 1.8 microns toward the emitter, and a photovoltaic receiver for receiving the infrared wavelengths, wherein the receiver comprises low bandgap photovoltaic cells, and wherein the emitter comprises a durable high temperature substrate, a refractory metal or metal silicide emitter layer on the substrate and a metal oxide antireflective layer of $HfO_2$, wherein the photovoltaic receiver comprises GaSb cells which convert to electricity infrared energy in wavelengths below 1.8 microns.

15. The generator of claim 14, further comprising a chemically isolating layer between the substrate and the emitter layer.

16. The generator of claim 14, wherein the emitter comprises a refractory metal emitter selected from the group of pure metals consisting of W, Ta, Nb and Mo, having a thickness of from about 1 to about 6 microns.

17. The generator of claim 14, wherein the emitter comprises a metal silicide emitter selected from the group of metal silicides consisting of $TaSi_2$, $NbSi_2$, $TiSi_2$ and $VSi_2$.

18. The generator of claim 14, wherein the antireflective layer has a thickness of about 0.14 microns and an antireflective wavelength of about 1.4 microns.

* * * * *